(12) United States Patent
Rasal et al.

(10) Patent No.: US 9,913,104 B2
(45) Date of Patent: Mar. 6, 2018

(54) VEHICLE LOCATION SERVICES

(71) Applicants: General Motors LLC, Detroit, MI (US); GM Global Technology Operations LLC, Detroit, MI (US)

(72) Inventors: Abuzafor M. Rasal, Hamtramck, MI (US); Zhoumin Hu, Troy, MI (US); Eray Yasan, Canton, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/003,369

(22) Filed: Jan. 21, 2016

(65) Prior Publication Data
US 2017/0215045 A1 Jul. 27, 2017

(51) Int. Cl.
*H04W 24/00* (2009.01)
*H04W 4/04* (2009.01)
*G01S 19/21* (2010.01)
*G01C 21/28* (2006.01)

(52) U.S. Cl.
CPC .......... *H04W 4/046* (2013.01); *G01S 19/215* (2013.01); *G01C 21/28* (2013.01)

(58) Field of Classification Search
CPC ....... H04W 4/046; G01S 19/215; G01C 21/28
USPC ............................ 455/456.2, 410, 414.1, 427
See application file for complete search history.

(56) References Cited

U.S. PATENT DOCUMENTS

| 8,255,393 | B1 * | 8/2012 | Yu | H04L 63/1441 |
| | | | | 707/724 |
| 8,311,983 | B2 * | 11/2012 | Guzik | G11B 27/034 |
| | | | | 340/539.13 |
| 8,620,306 | B2 * | 12/2013 | Pon | G01S 19/06 |
| | | | | 342/357.2 |
| 8,627,484 | B2 * | 1/2014 | Beckley | H04W 4/001 |
| | | | | 726/26 |
| 8,781,442 | B1 * | 7/2014 | Link, II | G08G 1/205 |
| | | | | 370/338 |
| 8,803,735 | B2 * | 8/2014 | McClure | G01S 19/07 |
| | | | | 342/357.24 |
| 8,886,457 | B2 * | 11/2014 | Brandt | G01C 21/20 |
| | | | | 455/344 |
| 9,075,137 | B2 * | 7/2015 | Wendel | G01S 19/03 |
| 9,086,285 | B2 * | 7/2015 | Gupta | G01C 21/165 |
| 9,119,063 | B2 * | 8/2015 | Beckley | H04W 4/001 |
| 9,196,149 | B2 * | 11/2015 | Grossman | H04W 4/028 |
| 9,199,609 | B2 * | 12/2015 | Rasal | B60R 25/2045 |
| 9,207,086 | B2 * | 12/2015 | Kim | G01S 19/48 |
| 9,250,083 | B2 * | 2/2016 | Czompo | G01C 21/165 |

(Continued)

*Primary Examiner* — Marceau Milord
(74) *Attorney, Agent, or Firm* — David Willoughby; Reising Ethington P.C.

(57) ABSTRACT

A vehicle communication system and method of improving location services for a user in a vehicle are described. The method includes the steps of: receiving at a backend system a first message from the vehicle based on a determination of a malicious attack associated with global navigation satellite system (GNSS) data received by the vehicle; receiving from a wireless carrier system (WCS) location data associated with a position of the vehicle; providing the location data to the vehicle from the backend system in response to the receipt of the first message; receiving a second message from the vehicle indicating that the malicious attack is no longer viable; and in response to receiving the second message, ceasing to provide the location data from the backend system.

18 Claims, 3 Drawing Sheets

(56) References Cited

U.S. PATENT DOCUMENTS

| | | | | |
|---|---|---|---|---|
| 9,507,028 B1* | 11/2016 | Yoo | ............ | G01S 19/40 |
| 9,538,493 B2* | 1/2017 | Dupray | ............ | H04W 64/00 |
| 9,648,029 B2* | 5/2017 | Cheng | ............ | H04L 63/1408 |
| 2011/0141276 A1* | 6/2011 | Borghei | ............ | H04W 12/08 |
| | | | | 348/143 |
| 2012/0167207 A1* | 6/2012 | Beckley | ............ | H04W 4/001 |
| | | | | 726/22 |
| 2013/0305323 A1* | 11/2013 | Kleve | ............ | H04L 9/3215 |
| | | | | 726/4 |
| 2013/0310068 A1* | 11/2013 | Fischer | ............ | G01S 19/05 |
| | | | | 455/456.1 |
| 2013/0324154 A1* | 12/2013 | Raghupathy | ............ | G01S 19/10 |
| | | | | 455/456.1 |
| 2014/0033310 A1* | 1/2014 | Cheng | ............ | H04L 63/1416 |
| | | | | 726/23 |
| 2014/0059655 A1* | 2/2014 | Beckley | ............ | H04W 4/001 |
| | | | | 726/4 |
| 2014/0351886 A1* | 11/2014 | Edge | ............ | G06F 21/60 |
| | | | | 726/3 |
| 2015/0188949 A1* | 7/2015 | Mahaffey | ............ | H04L 63/20 |
| | | | | 726/1 |
| 2016/0066189 A1* | 3/2016 | Mahaffey | ............ | G06F 21/316 |
| | | | | 455/405 |

\* cited by examiner

– 1 –
VEHICLE LOCATION SERVICES

TECHNICAL FIELD

The present invention relates to improving vehicle location services.

BACKGROUND

Global Navigation Satellite System (GNSS) devices (which include, among other things, global positioning system (GPS) devices) are subject to various types of malicious attacks. One such attack is known as a man-in-the-middle (MITM) attack where the malicious party or attacker might receive a legitimate GNSS signal and then transmit an illegitimate GNSS signal to the intended recipient devices (e.g., spoofing the original GNSS signal). In other attacks, the malicious attacker may generate an illegitimate GNSS signal. Thus, in one form or another, the recipient devices receive an illegitimate signal and mistakenly believe that to be an authentic signal (or a GNSS signal from a legitimate GNSS satellite). Using these and other similar techniques, the malicious attacker may disseminate inaccurate GNSS signal data to one or more GNSS recipient devices. Modern GNSS chipsets receive and use GNSS data from three or four different satellites to calculate GNSS position. When one or more of these GNSS signals is spoofed (providing inaccurate data), the recipient GNSS chipset may determine an incorrect position, an incorrect heading, or both. In some instances, the magnitude of this error may be substantial and place the user of the recipient device in dangerous scenario.

Thus, a countermeasure is needed so that the recipient device can determine an accurate position and/or heading during a malicious attack.

SUMMARY

According to an embodiment of the invention, there is provided a method of improving location services for a user in a vehicle. The method includes the steps of: receiving at a backend system a first message from the vehicle based on a determination of a malicious attack associated with global navigation satellite system (GNSS) data received by the vehicle; receiving from a wireless carrier system (WCS) location data associated with a position of the vehicle; providing the location data to the vehicle from the backend system in response to the receipt of the first message; receiving a second message from the vehicle indicating that the malicious attack is no longer viable; and in response to receiving the second message, ceasing to provide the location data from the backend system.

According to another embodiment of the invention, there is provided a method of improving location services for a user in a vehicle. The method includes the steps of: determining at the vehicle a condition indicating a malicious attack associated with a vehicle global navigation satellite system (GNSS) module; in response to determining the condition, sending a location data request message from the vehicle to a backend system; in response to sending the location data request message, receiving location data from the backend system; determining that the condition no longer exists; and in response to determining that the condition no longer exists, providing a termination request message to the backend system.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to improving Global Navigation Satellite System (GNSS) location services to a user of a vehicle during a malicious attack (e.g., during a hack of GNSS signal data). It is presently possible for a malicious attacker or hacker generate and transmit illegitimate or malicious GNSS-like signals which mimic legitimate signals from one or more GNSS satellites. Thus, recipients of these signals may receive inaccurate location information. For example, location information from a GNSS satellite may include any suitable positioning-related data or location data (e.g., having location data elements such as timestamp data, Doppler frequency data, and the like; suitable GNSS-related location data and location data elements will be appreciated by skilled artisans). The malicious attacker may transmit a malicious signal with one or more inaccurate or malicious location data elements. Consequently, when a vehicle GNSS module receives the one or more inaccurate data elements, these data elements will be used by the module to determine its GNSS location. Of course, where inaccurate data is the input criteria, the output (i.e., the module's calculated GNSS location) will also be inaccurate (e.g., GIGO or garbage-in, garbage-out).

The communication system described below utilizes a defensive method or countermeasure method in circumstances where the vehicle detects and determines a condition indicative of such a malicious attack. For example, when the malicious attack is determined, the vehicle communicates with a backend system which in turn acquires vehicle location information from a wireless carrier system; then, the backend system provides the location information to the vehicle. This process may continue until the malicious threat has ceased.

The vehicle communication system is described in greater detail below. Thereafter, one or more defensive/countermeasure methods are described.

Communications System—

Figure 1:
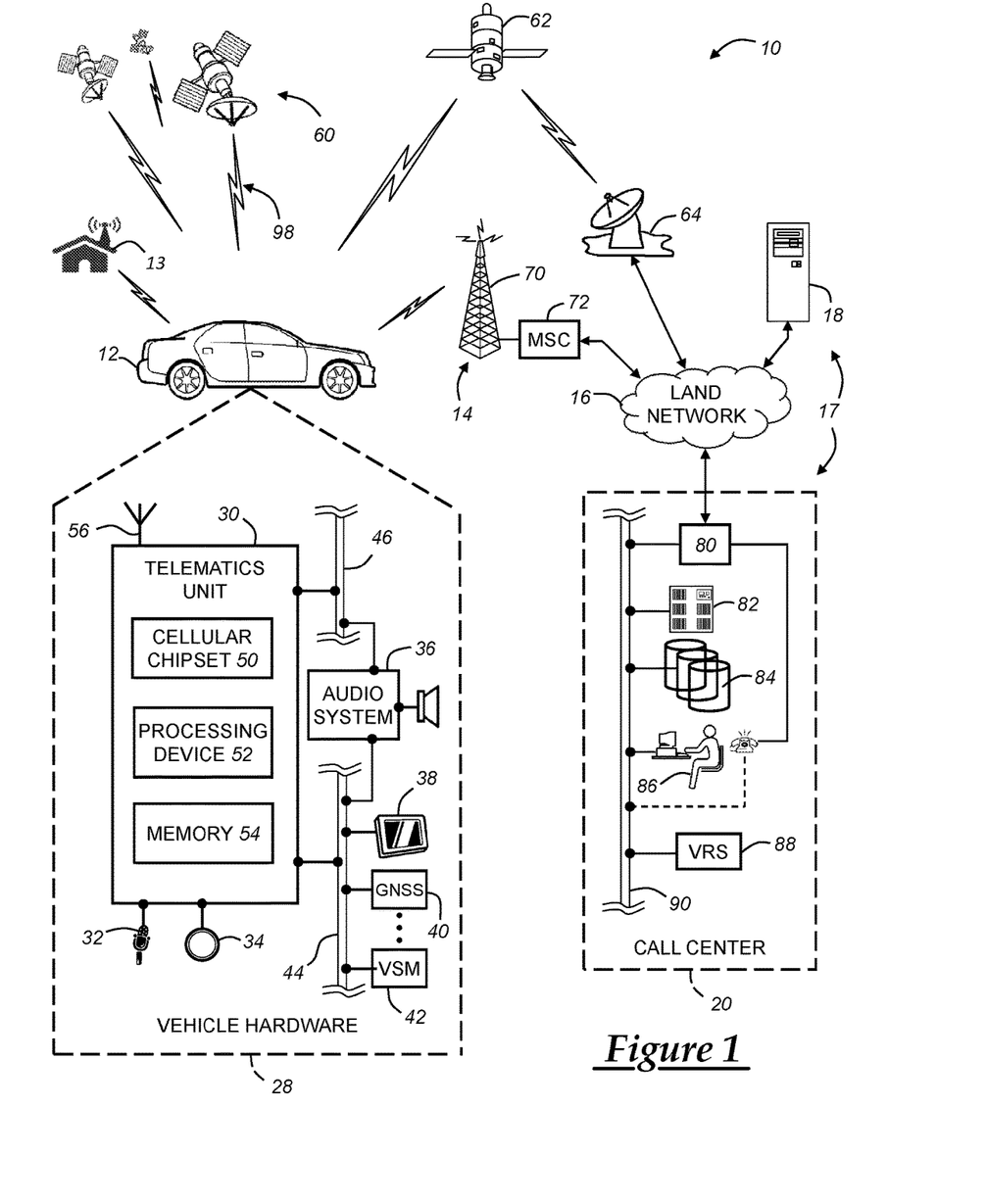
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, local wireless infrastructure 13, one or more wireless carrier systems (WCSs) 14, a land communications network 16, and a backend system 17 which may comprise a computer or server 18 and a data service center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a Global Navigation Satellite System (GNSS) module 40 as well as a number of vehicle system modules (VSMs) 42. As will be discussed below, the GNSS module 40 may provide global position system (GPS) services (and additionally provide other services known in the art: Glonass, Beidou, Galileo, etc.). Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with data service center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data service center 20) and data communication (e.g., to provide GNSS location data or vehicle diagnostic data to the data service center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication, the telematics unit may use TCP/IP.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Memory 54 may include any suitable non-transitory computer usable or readable medium, which may include one or more storage devices or articles. In at least one implementation, at least a portion of memory 54 may be comprised within processor 60 (e.g., in a microprocessor). Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Telematics unit 30 can be used to provide a diverse range of vehicle services that involve wireless communication to and/or from the vehicle. Such services include: turn-by-turn directions and other navigation-related services that are provided in conjunction with the GNSS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

Global Navigation Satellite System (GNSS) module 40 receives radio signals from a constellation 60 of GNSS satellites. From these signals, the module 40 can determine vehicle position, vehicle heading, or both that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GNSS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data service center 20 or other remote computer system, such as computer 18, for other purposes, such as fleet management. Also, new or updated map data can be downloaded to the GNSS module 40 from the data service center 20 via the telematics unit 30.

Figure 2:
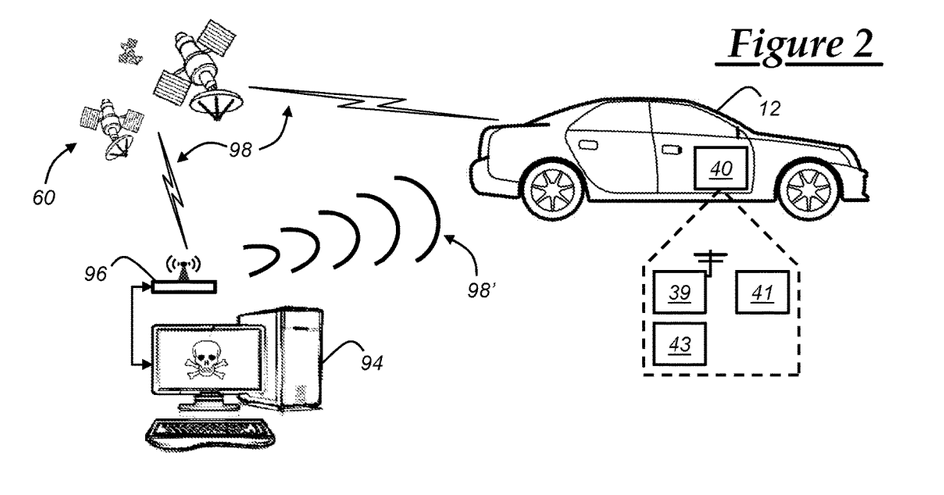
FIG. 2 is a schematic diagram illustrating a man-in-the-middle attack.

As shown in FIG. 2, the GNSS module 40 may comprise a GNSS chipset 39, as well as dedicated processor(s) 41 and memory 43. The GNSS chipset 39 may adapted to receive one or more GNSS signals; e.g., in at least one implementation, the chipset 39 may be adapted to receive at least four GNSS signals simultaneously. The processor 41 and memory 43 may be adapted to perform calculations associated with the received GNSS signals—e.g., to determine location data associated with the vehicle 12—and to communicate with other vehicle system modules 42. In at least one embodiment, the processor 41 and memory 43 may have similar physical characteristics and features as that of processor 52 and memory 54; however, of course, the processor 41 and memory 43 may be adapted and/or configured (e.g., via software, firmware, or the like) to perform or execute tasks, routines, programs, or any combination thereof associated with the GNSS module 40 (i.e., rather than the telematics unit 30). In another embodiment, execution of at least some GNSS module tasks, routines, programs, etc. occurs at the telematics unit 30. And in at least one implementation, the GNSS module 40 does not include a dedicated processor 41 or memory 43; e.g., the telematics unit 30 or other VSM 42 performs processing and data storage functions.

Returning to FIG. 1, apart from the audio system 36 and GNSS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem programs, OBD tests, etc.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle.

Local wireless infrastructure 13 includes any suitable wireless device that is part of roadway infrastructure and adapted to communicate with passing or nearby vehicles, such as vehicle 12. Infrastructure 13 is adapted to enable at least one type of short range wireless communication (SRWC) link with vehicle 12. This may include using a Wi-Fi protocol, a Bluetooth protocol, etc. As used herein, infrastructure 13 further includes wireless hotspots and SRWC from local commercial enterprises, municipalities, and the like. Infrastructure 13 may include one or more systems of networked communication devices placed along roadways, parking lots, etc. Such infrastructure may be available in populated geographic areas (e.g., such as metropolitan cities).

Wireless carrier system (WCS) 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000), GSM/GPRS or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data service center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 16, but could include wireless telephony equipment so that it can communicate directly with a wireless network, such as wireless carrier system 14.

Computer or server 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data service center 20, or both. A computer 18 can also be used for providing Internet connectivity such as DNS services or as a network address server that uses DHCP or other suitable protocol to assign an IP address to the vehicle 12. One or more computers 18 may be connected via a network with the data service center 20, while other computers 18 may not be so connected.

Data service center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various data service center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned data service center 20 using live advisor 86, it will be appreciated that the data service center can instead utilize VRS 88 as an automated advisor or, a combination of VRS 88 and the live advisor 86 can be used.

Method—

Turning now to FIG. 2, there is shown a malicious attacker 94 (e.g., represented by a computer device) and a wireless device 96 participating in a man-in-the-middle attack involving the constellation of GNSS satellites 60 and vehicle 12. The illustrated attacker 94 and wireless device 96 are merely an example (for instance, attacker 94 and wireless device 96 collectively could be a cellular telephone, a wireless notebook, or the like). FIG. 2 illustrates that the attacker 94 via wireless device 96 receives an authentic (e.g., original or legitimate) GNSS signal 98 and then transmits a spoofed (e.g., inaccurate, forged, or otherwise illegitimate) GNSS signal 98'. It should be appreciated that in many instances the attacker need not first receive a legitimate GNSS signal 98 in order to transmit the illegitimate signal 98'. While the vehicle 12 (i.e., the GNSS module 40) may receive one or more authentic GNSS signals 98, the vehicle may also receive one or more illegitimate GNSS signals 98' from attacker 94. In addition, as will become more apparent in the description that follows, other GNSS devices (e.g., devices other than module 40) also may receive the spoofed GNSS signal(s) 98'. Thus, the spoofed GNSS signal(s) 98' may affect other local GNSS or GNSS devices as well.

As used herein, illegitimate GNSS signals include those signals in which the malicious signal 98' may overpower the authentic signal 98 (e.g., which would also be received by vehicle 12). The illegitimate signal 98' may be aimed at vehicle 12 (e.g., using directional antennas) or may be transmitted broadly (e.g., using omni-directional antennas). Other malicious techniques will be appreciated by skilled artisans.

Figure 3A:
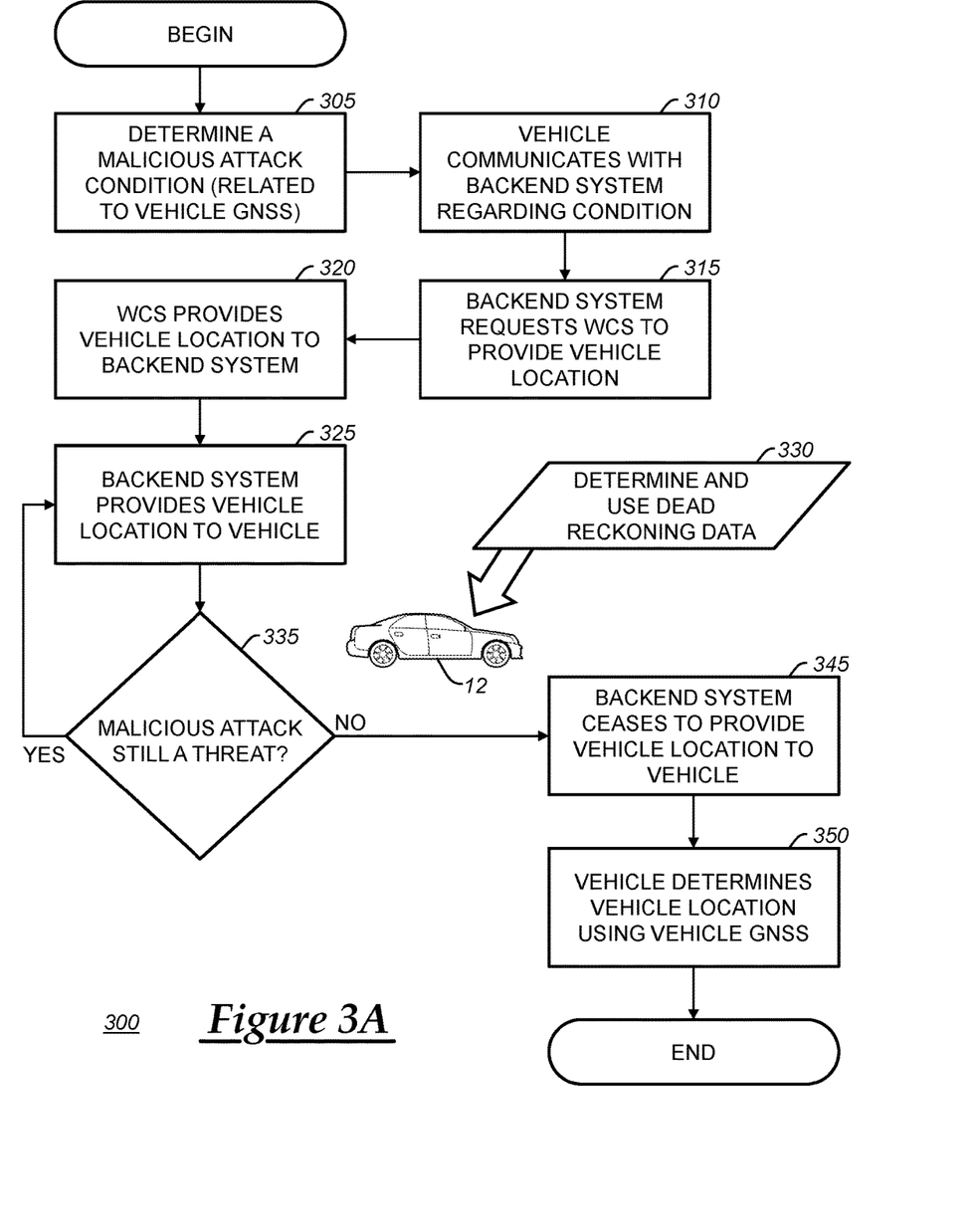
FIGS. 3A-3B are flow diagrams depicting a method of improving location services for a vehicle user.
Figure 3B:
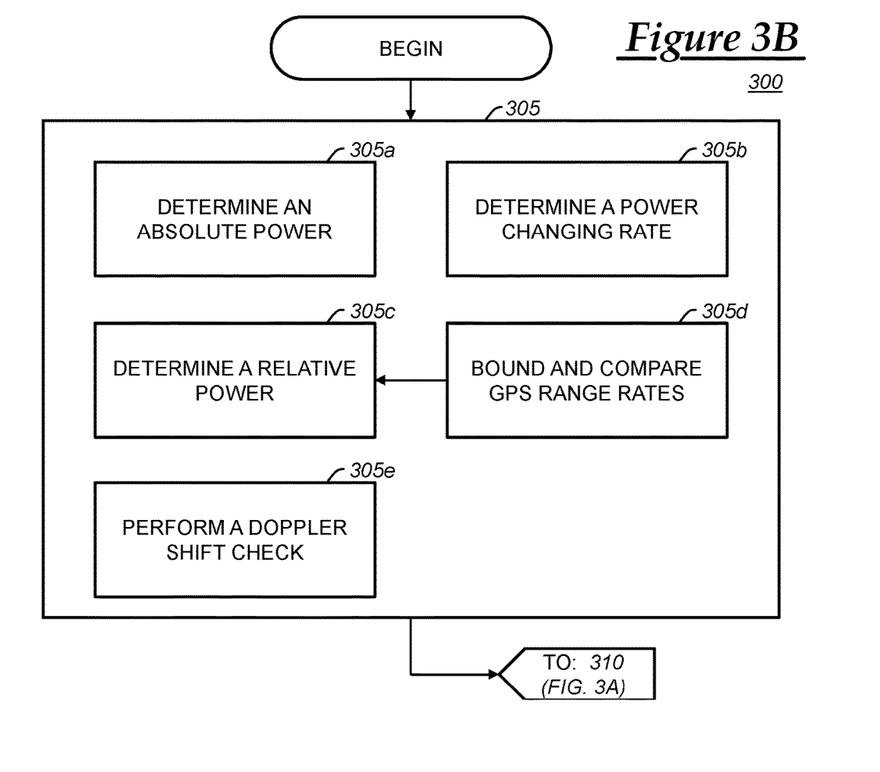

Turning now to FIGS. 3A and 3B, these figures illustrate a method 300 of improving location services for a user in a vehicle using elements or components outside of vehicle 12 (e.g., a system-based solution or extra-vehicle solution). For example, modern GNSS chipsets, such as GNSS chipset 39, may be configured to detect the presence of a malicious attack. However, upon detection, modern GNSS chipsets may simply ignore the illegitimate GNSS satellite data; i.e., they are not equipped to otherwise determine the location data of the GNSS device during the malicious attack. Method 300 describes a process which overcomes this limitation—providing location services to a vehicle user even in the presence of the malicious attack. As will be described in greater detail below, method 300 uses one or more elements or components of communication system 10 to provide location services, rather than solely relying upon the GNSS module 40. Method 300 begins with step 305.

In step 305, a condition associated with a malicious attack is determined. In one aspect, this may occur at vehicle 12. FIG. 3B illustrates step 305 in greater detail—showing several exemplary techniques by which the vehicle 12 (e.g., GNSS module 40) may determine the condition. The techniques illustrated in FIG. 3B may be used singly or in combination with one another. For example, technique 305a includes determining an absolute power of a GNSS signal. An authentic GNSS signal (98) may be expected to have a signal power that does not exceed a predetermined threshold (e.g., for one GNSS channel, the threshold could be −153 dBw; for another GNSS channel, the threshold could be −155 dBw; and for yet another GNSS channel, the threshold could be −158 dBw). In at least one implementation, the illegitimate GNSS signal (98') will have a signal power increase of at least 3 dB (i.e., 3 dB greater than the thresholds of −153 dBw, −155 dBw, and −158 dBw). Therefore, by comparing the absolute power of a received GNSS signal to a predetermined threshold (e.g., associated with at least one of the channels of the GNSS module 40), the GNSS module 40 may determine one condition indicating whether a GNSS attack exists.

Technique 305b includes determining a power changing rate of a received GNSS signal. The power changing rate of a GNSS signal may be assumed to be generally constant for a short time interval. This assumption is based on the criteria that the satellite is approximately 20,000 kilometers from the vehicle 12, and a relatively small subtended angle exists between the vehicle 12 and satellite (60). More specifically, the subtended angle from the perspective of vehicle 12 is small with respect to two positions of the satellite (60)—the first satellite position being associated with an initial time ($t_0$) of the interval and the second position of the satellite being associated with a final time ($t_F$) of the interval. However, where a malicious attacker 94 is the source of the GNSS signal (98'), the power changing rate may vary substantially over the same time interval. This may occur due to the changing position of the malicious attacker 94, the changing position of the vehicle 12, or both. Thus, for a given time interval, a predetermined threshold associated with the power changing rate of an authentic GNSS signal may be used to determine whether the received GNSS signal is authentic or illegitimate. When the power changing rate associated with the received signal exceeds the threshold, GNSS module 40 may determine a condition indicative of a malicious attack.

Technique 305c includes determining a relative power of a GNSS signal (e.g., compared with at least one other received GNSS signal). For example, the GNSS module 40 may receive a first GNSS signal at power A, a second GNSS signal at power B, a third GNSS signal at power C, and a fourth GNSS signal at power D, and the module 40 may calculate relative power ratios (e.g., A/B, A/C, A/D, B/A, B/C, B/D, C/A, C/B, C/D, D/A, D/B, and D/C). Based on these ratios, a relative range may be determined. If any of the relative power ratios are not within the relative range, the GNSS module 40 may determine a condition indicative of a malicious attack. In other implementations, the relative range may be predetermined instead of calculated; further, the ratios (and quantity of GNSS signals used) are merely exemplary. Other quantities and ratios also may be used.

Technique 305d includes bounding and comparing GNSS range rates. More specifically, this technique involves correlating the code range(s) and phase range(s) of the received GNSS signal to arrive at a phase range rate. Code ranges, phase ranges, phase range rates, and the techniques and associated calculations using such ranges and rates are known to skilled artisans. In one attack, the malicious attacker may spoof the phase range(s); however, when the GNSS module 40 (or vehicle 12) is moving, the phase range rate may be sacrificed and the GNSS module 40 may detect that the phase range rate is outside of a predetermined or expected threshold (e.g., by comparing code and phase range rates). Thus, by bounding and comparing GNSS range rates, the GNSS module 40 may determine a condition indicating a malicious attack.

And technique 305e includes performing a Doppler shift check. It will be appreciated that GNSS module 40 may determine vehicle position data and a satellite position data (e.g., a vehicle position relative to a satellite position). Thus, GNSS module 40 may calculate relative speed of the GNSS module 40 (e.g., vehicle 12) with respect to the transmitting satellite (60); and from this data, a Doppler shift may derived. This process and technique is known to skilled artisans. Since it is difficult for a malicious attacker to mimic all GNSS satellites transmitting GNSS signals to vehicle 12, an outlier may be determined (the spoofer) by comparing respective Doppler shifts. If an outlier is determined, a malicious attack condition may be determined. In addition, when the GNSS module 40 compares a calculated Doppler shift with a respective range rate, a discrepancy or lack of correlation may be an additional indicator of a malicious attack.

It should be appreciated these and other detection techniques may be used by skilled artisans to determine an indication of the malicious attack. These techniques are not intended to be limiting. For example, GNSS module 40 may perform cross-correlations, residual analyses, range differences caused by iconospheric effects, ephemeris data comparisons, jump detection, and the like.

Step 305 could occur in other manners as well. For example, the backend system 17 may provide a communication to vehicle 12 (and other similarly located vehicles) indicating the attack. Or the vehicle may receive data from local infrastructure 13 indicating the attack. These also are merely examples and are not intended to be limiting. Following step 305, the method 300 proceeds to step 310 (FIG. 3A).

In step 310, the vehicle (via telematics unit 30) communicates with the backend system 17 advising the backend system 17 of the malicious attack condition determined in step 305. The communication further may include a request from vehicle 12 for location data associated with vehicle 12. This may occur by vehicle 12 sending a message to the backend system 17—e.g., a packet data message, a SMS message, sending the message (data) over a voice call (e.g., using a vocoder), etc. In one implementation, the vehicle 12 initiates the communication; however, this may not require vehicle user interaction (e.g., the vehicle could communicate with backend system 17 automatically upon detection of the malicious attack condition; i.e., without being initiated by the vehicle user). In other embodiments, the backend system 17 may initiate the communication. For example, system 17 may query the vehicle 12 regarding a GNSS status and vehicle 12 may respond providing a message regarding the condition (e.g., periodic queries or the like). Following step 310, the method proceeds to step 315.

In step 315, backend system 17 requests vehicle location information from the wireless carrier system (WCS) 14. WCS 14 may acquire the vehicle location information via one or more techniques. For example, base stations (or Evolved Node Bs (eNBs), in LTE architectures) may triangulate a position of vehicle 12 using communications between the WCS 14 and telematics unit 30. Triangulation techniques and calculations are known and will not be discussed further here. Another example of how WCS 14 may acquire vehicle location information includes use of enhanced cellular identification (E-Cell ID). As will also be appreciated by skilled artisans, E-Cell ID enables the location of vehicle 12 to be narrowed to a region within a cell associated with a particular cellular tower. More specifically, the narrowed region may be identified using techniques involving cellular power signal strength, cellular signal quality (e.g., SNR), receive-transmit (RX-TX) time differentials, and the like. Another example of how WCS 14 may acquire vehicle location information includes use of Observed Time Difference of Arrival—e.g., a technique where a device receives a reference signal time difference on downlink (e.g., from a base station (BS) to user equipment (UE)) on multiple base stations. Triangulation, E-Cell ID, and Observed Time Difference of Arrival may be used singly or in combination with one another to determine a location of vehicle 12.

It should be appreciated that other techniques may be used by WCS 14 as well. However, techniques which require location data from the particular vehicle (e.g., from GNSS module 40) would not be considered desirable since (in step 305) the vehicle determined that GNSS signal data was corrupted/illegitimate. Thus, cellular infrastructure which relies upon vehicle GNSS data (e.g., such as services associated with public-safety answering point (PSAP)) may not be requested from WCS 14 (or otherwise used). Thus, in at least one implementation of step 315, backend system 17 requests vehicle location information from the WCS 14 that does not require querying the GNSS module 40 of vehicle 12. Following step 315, the method 300 proceeds to step 320.

In step 320, WCS 14 communicates the acquired vehicle location information to backend system 17 (e.g., via a cellular link, a link via the land network 16, or both). The location information may include latitude data, longitude data, timestamp data, etc. Further, this information may be approximated or estimated where specific values were indeterminate. Step 325 follows.

In step 325, backend system 17 provides the acquired vehicle location information to vehicle 12—e.g., via a packet data message, a SMS message, sending the message (data) over a voice call (e.g., using a vocoder), etc. This location information may be received via telematics unit 30 in vehicle 12 and thereafter be provided to GNSS module 40.

Next, in step 330, the vehicle location information received in step 325 may be supplemented with dead reckoning (DR) data. For example, using the last known location data (prior to the malicious attack) and the received location information, the vehicle 12 may determine its current position (e.g., based on vehicle speed(s) and elapsed time). DR data may be determined at the GNSS module 40, the telematics unit 30, or any other suitable VSM 42. DR techniques and implementations are known to skilled artisans and will not discussed further here. In some implementations, method 300 may skip or omit step 330. Thus, following step 325 (and/or step 330), the method proceeds to step 335.

In step 335, the vehicle determines whether the malicious attack (determined in step 305) is still a threat (e.g., whether any suitable intra-vehicle techniques could enable the GNSS module 40 to determine an accurate position and/or heading—i.e., without the assistance of the backend system 17). Thus, in one embodiment, vehicle 12 may re-determine whether the malicious attack condition continues to exist (e.g., repeating step 305). In some implementations, this re-determination may be continuous. In other instances, the re-determination may be periodic (e.g., checking at regular intervals whether the malicious threat still exists). In at least one implementation, vehicle 12 (e.g., module 40) determines whether the malicious attack has ceased (e.g. or ceased for a predetermined period of time). In another implementation, vehicle 12 (e.g., module 40) determines whether the malicious attack no longer poses a threat (e.g., the attack is on-going; however, the spoofing is no longer a threat because it is not adversely affecting the intra-vehicle determination of location services). And in another implementation, vehicle 12 (e.g., module 40) determines that the vehicle location information acquired via the WCS 14 corresponds to the location data being determined by the GNSS module 40. This correspondence may be within a predetermined tolerance or threshold (e.g., a sufficiently close match which would indicate to a skilled artisan that the malicious threat has ceased). These techniques may be used singly or in combination with one another. When the malicious attack remains a threat, the method loops back to (at least) step 325. And when the malicious attack is no longer a threat, the method 300 proceeds to step 345.

When the method 300 loops back to step 325, backend system 17 may provide new or updated vehicle location information. This may include repeating steps 315 and/or 320, as described above.

In step 345, the backend system 17 ceases to query the WCS 14 and ceases to provide location information to vehicle 12 (via the cellular link, SMS, etc.). This cessation may be in response to the vehicle 12 communicating (e.g., a termination request message) to the backend system 17 (e.g., because the malicious attack no longer poses a threat). Then, method 300 proceeds to step 350.

In step 350, vehicle 12 (or GNSS module 40) again utilizes authentic GNSS signal data received from satellites 60 to determine its own location data. This may continue until another malicious threat arises. It should be appreciated that steps 305-350 may be performed seamlessly, e.g., without user interaction. Thus, from the perspective of the vehicle user, vehicle location services may continue to be performed as if there was no attack (e.g., receiving turn-by-turn directions, providing points of interest or other navigation information, etc.). In other implementations, the user may be notified of a degradation in services (e.g., via display 38 or a vehicle audio system). And in at least one implementation, vehicle OBD features may record the incident and report it to backend system 17.

It should be appreciated that method 300 described above overcomes issues encountered during a malicious GNSS signal attack that may not be overcome using V2I (vehicle-to-infrastructure) solutions and V2V (vehicle-to-vehicle) solutions. For example, V2I solutions can utilize local transceivers (e.g., wireless access points) to provide vehicle 12 with location information; however, V2I solutions also require that the local infrastructure 13 exists or is proximate vehicle 12. Skilled artisans will appreciate that in many cities, towns, and rural areas, such infrastructure 13 is not in place—at least not at the present time. Thus, many scenarios exist where V2I is not a desirable solution. As for V2V solutions where vehicle 12 might rely upon other vehicles to provide it location data (e.g., based on GNSS satellite data received by those vehicles), should vehicle 12 experience a malicious attack, any other vehicles in relative proximity to vehicle 12 are likely to experience the same malicious attack. Thus, should those other vehicle provide location data to vehicle 12, the data would be the same illegitimate data receivable by vehicle 12.

As discussed above, method 300 utilizes backend system 17 (and WCS 14) to acquire non-GNSS signal data and does not need to rely upon V2I or V2V information. However, it should be appreciated that V2I information, in some implementations, could supplement the location information acquired by backend system 17.

Thus, there has been described a method of improving location services for a user in a vehicle during a malicious attack (e.g., wherein the vehicle receives illegitimate GNSS signal data). The method includes the vehicle determining the existence of a malicious threat and a backend system (associated with the vehicle) utilizing a wireless carrier system (WCS) to acquire position information associated with the vehicle from the WCS. During the method, the backend system provides the location information (acquired from the WCS) to the vehicle until the malicious attack is no longer a threat to the determination of vehicle location data using the vehicle's GNSS system.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of improving location services for a user in a vehicle, comprising the steps of:
   receiving at a backend system a first message from the vehicle based on a determination of a malicious attack associated with global navigation satellite system (GNSS) data received by the vehicle;
   receiving from a wireless carrier system (WCS) location data; that indicates the vehicle's location and that is determined at the WCS independently of any GNSS data, wherein the WCS determines the location data based on wireless communications with the vehicle;
   providing the location data to the vehicle from the backend system in response to the receipt of the first message, whereby the vehicle's location can thereby be determined at the vehicle without the use of the GNSS data;
   receiving a second message from the vehicle indicating that the malicious attack is no longer occurring; and
   in response to receiving the second message, ceasing to provide the location data from the backend system.

2. The method of claim 1, wherein receiving the first message is in response to the vehicle determining at least one of:
   an absolute power associated with at least one of a plurality of GNSS signals which are associated with a plurality of GNSS satellites;
   a power changing rate of at least one of the plurality of GNSS signals;
   a relative power associated with at least some of the plurality of GNSS signals;
   a phase range rate is outside of an expected threshold; or
   a Doppler shift check associated with at least one of the plurality of GNSS signals.

3. The method of claim 1, wherein the location data comprises latitude data and longitude data.

4. The method of claim 1, wherein the received location data is acquired using a triangulation technique, an enhanced cell identification (E-Cell ID) technique, an Observed Time Difference of Arrival technique, or a combination thereof.

5. The method of claim 1, wherein the received location data is not associated with public-safety access point (PSAP) data.

6. The method of claim 1, further comprising providing updated location data to the vehicle from the backend system, prior to receiving the second message.

7. The method of claim 1, wherein the second message is received in response to at least one of: (a) a determination at the vehicle that the malicious attack has ceased, (b) a determination that the malicious attack is no longer adversely affecting location services provided by a GNSS module in the vehicle, or (c) a determination at the vehicle that the location data provided by the backend system corresponds to second location data determined by the GNSS module.

8. The method of claim 7, wherein the determined correspondence of the location data provided by the backend system and the second location data is within a predetermined tolerance.

9. A method of improving location services for a user in a vehicle, comprising the steps of:
   determining at the vehicle a condition indicating a malicious attack associated with a vehicle Global Navigation Satellite System (GNSS) module;
   in response to determining the condition, sending a location data request message from the vehicle to a backend system;
   in response to sending the location data request message, receiving location data from the backend system, wherein the location data originated from a wireless carrier system independently of GNSS data;
   determining vehicle location using the location data received from the backend system;
   determining that the condition no longer exists; and
   in response to determining that the condition no longer exists, providing a termination request message to the backend system.

10. The method of claim 9, wherein determining the condition indicating the malicious attack further comprises determining that the GNSS signal data has been spoofed by a malicious attacker.

11. The method of claim 10, wherein determining the condition indicating the malicious attack further comprises determining at the vehicle at least one of:
    an absolute power associated with at least one of a plurality of GNSS signals which are associated with a plurality of GNSS satellites;
    a power changing rate of at least one of the plurality of GNSS signals;
    a relative power associated with at least some of the plurality of GNSS signals;
    a phase range rate is outside of an expected threshold; or
    a Doppler shift check associated with at least one of the plurality of GNSS signals.

12. The method of claim 9, wherein the location data received from the backend system comprises latitude data and longitude data.

13. The method of claim 9, further comprising receiving updated location data at the vehicle from the backend system, prior to determining that the condition no longer exists.

14. The method of claim 9, wherein determining that the condition no longer exists further comprises at least one of the following:
    determining at the vehicle that the malicious attack has ceased;
    determining at the vehicle that the malicious attack continues however is no longer adversely affecting location services provided by a GNSS module in the vehicle; or
    determining at the vehicle that location data provided by the backend system corresponds to second location data determined by the GNSS module.

15. The method of claim 14, wherein the determined correspondence is within a predetermined tolerance.

16. The method of claim 9, further comprising using the location data to provide location services to a vehicle user.

17. The method of claim 16, further comprising determining dead reckoning (DR) data at the vehicle and using the provided location data and the DR data at the vehicle to provide the user location services.

18. The method of claim 9, wherein determining the condition indicating the malicious attack, sending the location data request message, and receiving the location data from the backend system occur seamlessly and without user interaction.

* * * * *